United States Statutory Invention Registration [19]

[11] Reg. Number: H319

Clayson [43] Published: Aug. 4, 1987

[54] GUN BLAST DIFFUSER

[75] Inventor: Arthur E. Clayson, Inyokern, Calif.

[73] Assignee: The United States of America as represented by the Secretary of the Navy, Washington, D.C.

[21] Appl. No.: 932,116

[22] Filed: Nov. 18, 1986

[51] Int. Cl.[4] ..... F41F 23/00

[52] U.S. Cl. ..... 89/37.16; 89/1.2

[56] References Cited

U.S. PATENT DOCUMENTS

| | | | |
|---|---|---|---|
| 2,899,866 | 8/1959 | Clark et al. | 89/37.5 |
| 3,520,226 | 7/1970 | Meadows et al. | 89/14 |
| 3,670,622 | 6/1972 | Bryant et al. | 89/14 C |
| 3,898,910 | 8/1979 | Groff | 89/14 C |
| 4,121,496 | 10/1978 | Clayson | 89/37.5 R |
| 4,534,265 | 8/1985 | Bates et al. | 89/14.6 |

*Primary Examiner*—Harold J. Tudor
*Attorney, Agent, or Firm*—William C. Townsend; W. Thom Skeer

[57] ABSTRACT

A rotating blast diffuser for a Gatling type gun is disclosed. The diffuser has a streamlined, forward nose containing gas stripping means individual to the barrels. The gas stripping means, annular members for example, strip muzzle blast from a firing barrel, and divert the blast into a forward collection chamber. The blast expands in the collection chamber and flows to an aft expansion chamber where it undergoes additional expansion. Vent holes in the aft expansion chamber permit the blast to exhaust this chamber. A peripheral housing is placed around the diffuser allowing the exhausted blast to undergo further expansion before venting into the atmosphere.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUN BLAST DIFFUSER

BACKGROUND OF THE INVENTION

1. Field of the Invention

The invention pertains generally to the field of aircraft armaments. In greater particularity, the invention pertains to automatic, high-rate-of-fire weapons, such as Gatling type machine guns or Gatling type cannons. By way of further characterization, the invention relates to a device for protecting aircraft structure and performance from the destructive effects of the gun blast associated with the firing of these weapons.

2. Description of the Prior Art

Arming aircraft with powerful, high-performance guns is a goal of today's military aircraft designers. Yet, the high pressure muzzle blast of an operating gun poses dangers to the host aircraft. The blast can damage aircraft structure and instruments. Further, engine operational problems such as compressor stall and engine flame-out can occur if guns are operated in proximity to engine intake ducts. The engine problems relate to the muzzle blast effects on air flow and air density in the vicinity of the ducts.

Methods of eliminating these dangers have focused on directing and/or diffusing the muzzle blast. Common schemes involve attaching a diffuser directly or indirectly to the muzzle of an aircraft gun, and then placing both the gun and diffuser within a housing. The diffusers of conventional design have both gas stripper sections and gas expansion sections. The stripper sections divert the blast from the neighborhood of the muzzle. The diverted blast then expands to a low pressure in the diffuser's expansion sections. Further expansion of the blast takes place within the housing surrounding the diffuser.

One method of blast control for aircraft mounted Gatling guns incorporates a blast diffuser similar to a pre-World War One muzzle brake. This diffuser is fastened directly to the muzzle ends of the gun's barrels. Though partially effective in controlling blast, the diffuser's weight causes the Gatling gun's rotating barrels to whip. The whipping motion increases the gun's shot dispersion and decreases its accuracy. Another means of Gatling gun blast control involves mounting a stationary diffuser independent of the gun's barrels. This type diffuser requires a generally oval shape to accommodate variations in firing barrel alignment and in propellant burning rates. Unfortunately, the oval shape allows some muzzle blast to escape the stripping and directing action of the diffuser.

Further reduction of muzzle blast effect is achieved by enclosing the diffusers within housings. The housings serve as expansion chambers in which high pressure muzzle blast dissipates even further before entering the atmosphere. Besides functioning as expansion chambers, some housings direct or deflect the blast away from the aircraft, and others divert the blast back towards the gun to negate the effects of successive blasts.

Conventional blast control devices are effective in reducing the effects of aircraft gun blast; however, their physical configurations impart considerable drag on the host aircraft.

SUMMARY OF THE INVENTION

The invention provides a rotating blast diffuser mounted directly to the barrels of a Gatling type aircraft mounted gun. A generally cylindrical blast tube surrounds the barrels and terminates forwardly with an arcuate shaped nose. Within the nose is a blast collection chamber that houses blast stripper means individual to the barrels. The blast collection chamber communicates to an aft expansion chamber located within the blast tube.

OBJECTS OF THE INVENTION

It is accordingly an object of the invention to provide a device for stripping, diffusing and directing the muzzle blast of an aircraft mounted weapon.

A further object of this invention is to provide a low drag shaped device for stripping, diffusing and directing the muzzle blast of an aircraft mounted weapon.

These and other objects of the invention will become apparent in view of the following specification, claims and drawing.

DESCRIPTION OF THE PREFERRED EMBODIMENT

Figure 1:
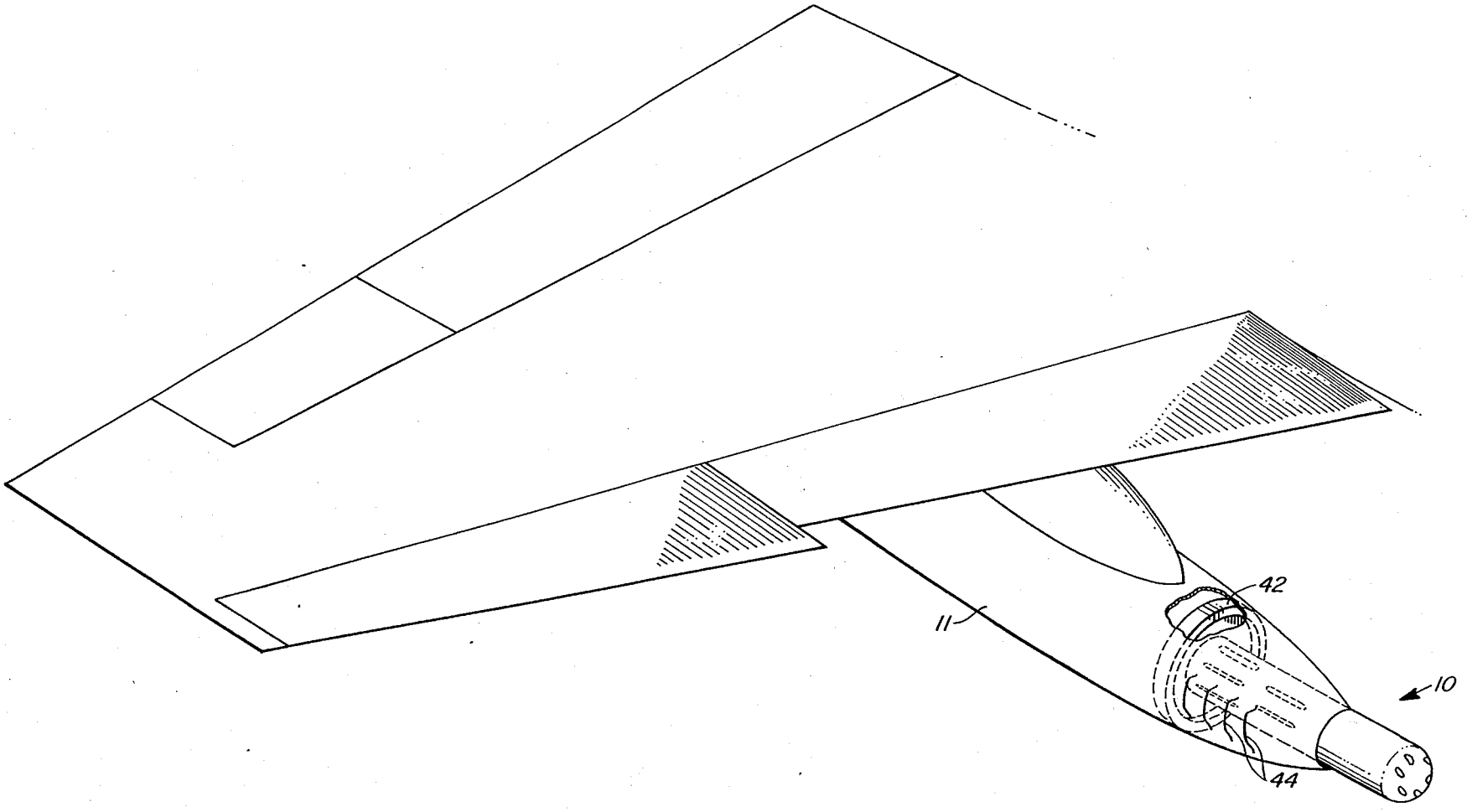
FIG. 1 depicts the aircraft gun diffuser and housing of the present invention in a representative, operational environment.

Referring to FIG. 1, diffuser 10 is shown mounted within peripheral housing 11. Housing 11 is depicted as mounted on a representative aircraft wing.

Figure 2:
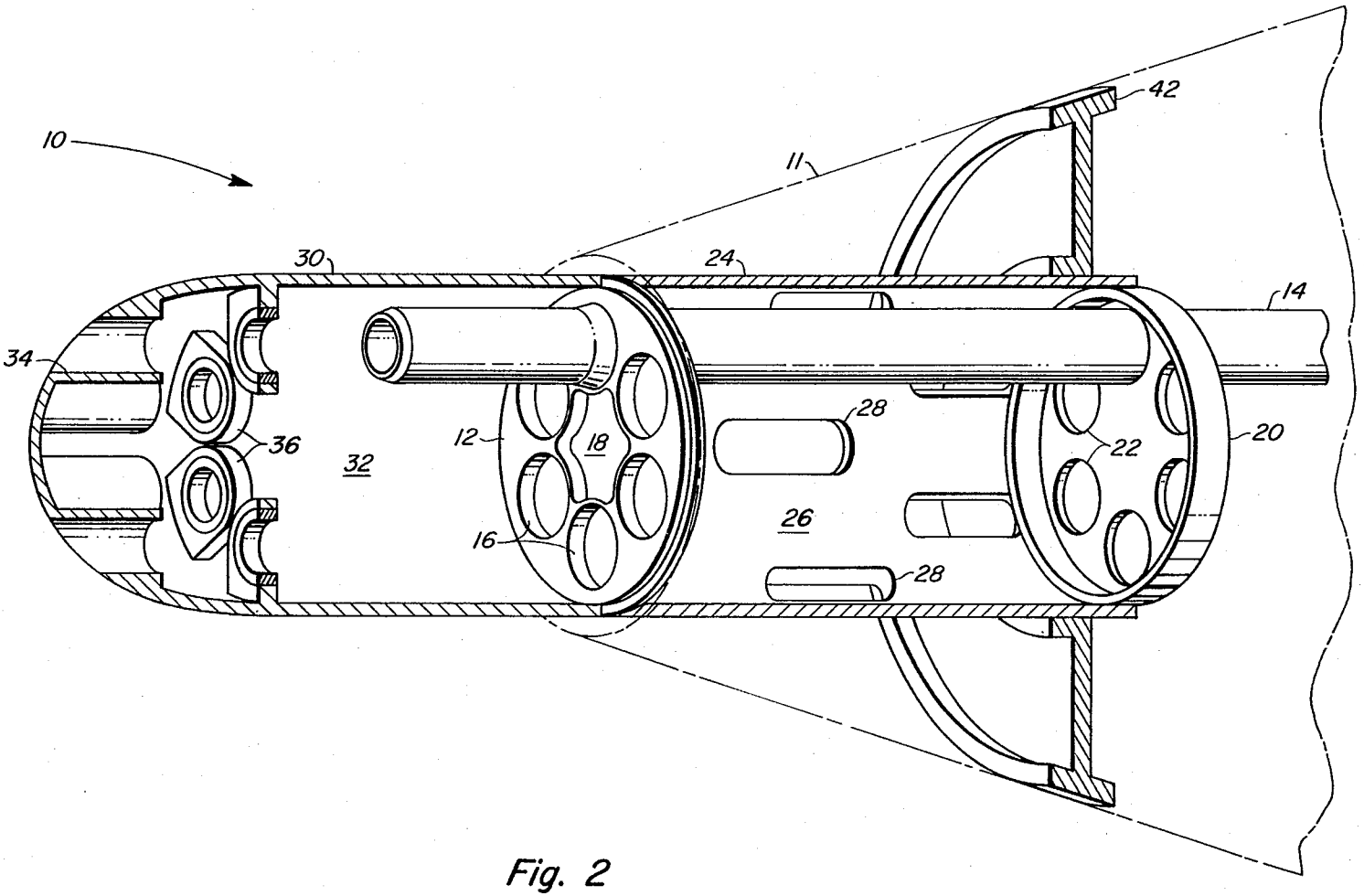
FIG. 2 is an isometric, partial cross section, of the preferred embodiment of the invention.

Referring to FIG. 2, there is illustrated a preferred embodiment of the invention wherein diffuser 10 is shown enclosed by peripheral housing 11. A first disk 12 is mounted to the muzzle ends of barrels 14 of a rotating barreled gun by any conventional securing means. First disk 12 has apertures 18 through which barrels 14 extend and one or more windows 18 through which muzzle blast can pass. Located between the first disk 12 and the breech ends of barrels 14 lies second disk 20. Second disk 20 has apertures 22 through which the barrels 14 extend, and is secured and sealed to barrels 14 by conventional means. Passage of muzzle blast between barrels 14 and second disk 20 is thereby prevented. Blast tube 24 surronds barrels 14 between the first disk 12 and second disk 20 and is mounted to the disks by conventional joining and sealing means such as welding. An alternative mounting proposal would allow blast tube 24 to remain stationary while barrels 14 rotated within. Leakage of muzzle blast between this stationary version of blast tube 24 and the discs can be prevented by conventional gas scaling means. In either proposal, blast tube 24 and the first and second disks, 12 and 20 respectively, form a blast expansion chamber 26 in which muzzle blast expands. Vents 28 are positioned along tube 24 to allow the expanded muzzle gas to exit the expansion chamber. Positioned forward of the muzzle ends of barrels 14 is an arcuate shaped, streamlined nose 30. The nose 30 is attached to barrels 14 by welding, or other conventional securing means, and is sealed to blast tube 24 by conventional gas sealing means. Nose 30 defines a blast collection chamber 32 in communication with the expansion chamber 28 by way of windows 18. Exit tubes 34, individual to barrels 14, are mounted to nose 30 and extend therethrough to provide a passageway for projectiles fired through barrels 14. In prototypes of the invention, tubes 34 were cast as a part of nose 30, however those skilled in the manufacturing art would realize that tubes 34 could be made independently of nose 30 and then attached thereto by a conventional securing means such as welding. Gas stripping means composed of annular members 36, are spaced between the exit tubes 34 and barrels 14. Annular members 36 are mounted to nose 30 and are coaxially aligned with the barrels 14 to afford clearance for projectiles fired through barrels 14. The clearance allows not only passage of the projectiles, but also serves to strip the gun blast from the firing barrel.

Figure 3:
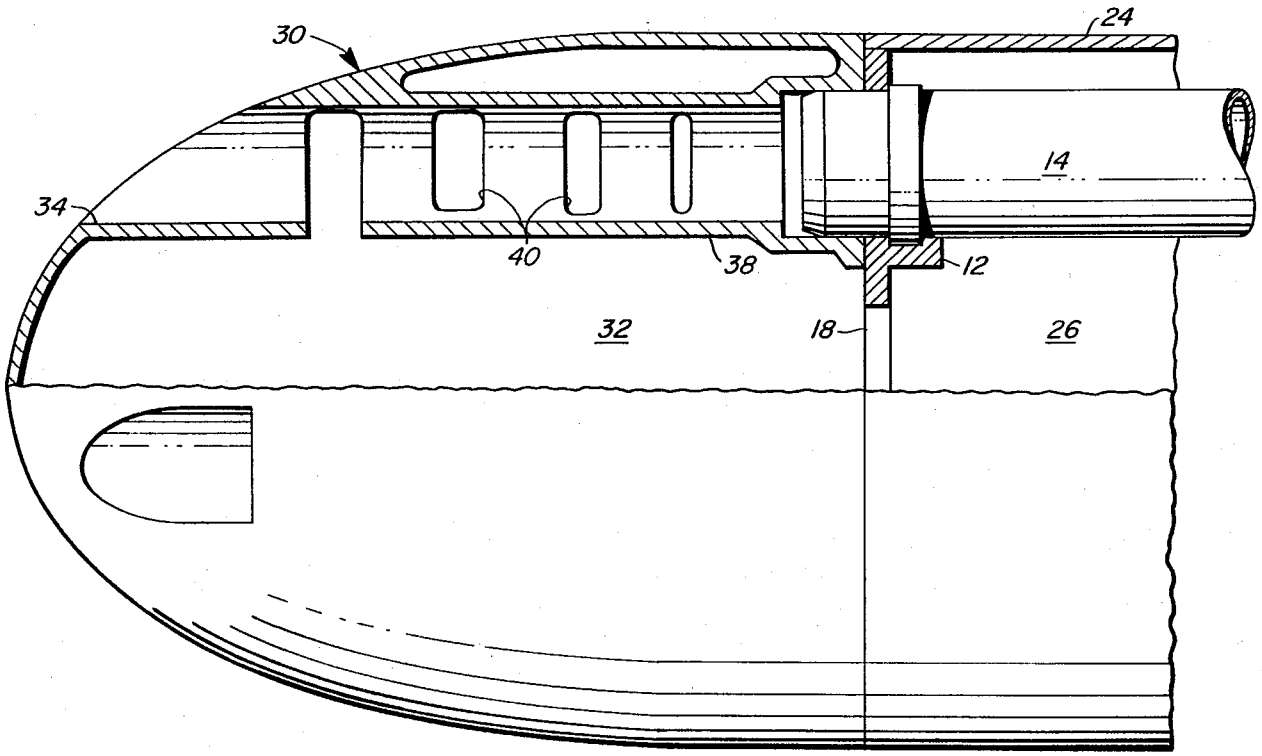
FIG. 3 is a cross section of alternate gas stripper means showed positioned within the nose of the present invention.

Referring to FIG. 3, an alternate gas stripping means is illustrated. In this version, tubular members 38, individual to barrels 14, are positioned within nose 30 between exit tubes 34 and barrels 14. Besides providing a passageway for projectiles fired through barrels 14, members 38 have one or more peripheral openings 40 that serve to strip or divert muzzle blast into collection chamber 32.

In prototypes of the invention, these gas stripping means, annular members 36 and tubular members 38, were made an integral part of nose 30 through casting, however an alternative approach would include fabricating the members independently of nose 30, and then attaching them to nose 30 by welding or other conventional securing means.

During operation of the gun, the high pressure gas occasioned by a fired projectile is stripped from a firing barrel by the gas stripping means within nose 30. The gas expands in collection chamber 32 of nose 30, and further expands by flowing through window 18 into expansion chamber 26 of blast tube 24. Finally, the gas exhausts at a low pressure through vents 28.

As seen in FIGS. 1 and 2, a peripheral housing 11 surrounds diffuser 10, and serves as an additional expansion chamber for the gas exhausted through vents 28. Seal 42 extends radially from blast tube 24 to housing 11, and is positioned rearwardly of vents 28 to direct the gas to flow away from the aircraft through the peripheral openings 44 in housing 11.

What is claimed is:

1. A device for directing and diffusing the muzzle blast of an aircraft mounted gun, said gun having a plurality of generally parallel barrels radially spaced, and rotatable about an axis generally parallel thereto, said barrels having forward muzzle ends and aft breech ends, the device comprising:

a first disk positioned proximate to said muzzle ends and mounted on said barrels so as to rotate therewith, said disk having a plurality of apertures through which said barrels extend and one or more windows for passage of muzzle blast therethrough;

a second disk positioned between said first disk and said breech ends and mounted on said barrels so as to rotate therewith, said second disk having a plurality of apertures through which said barrels extend, said second disk sealably engaging said barrels so that said muzzle blast is prevented from passing between said barrels and said second disk;

a blast tube surrounding said barrels between said disks, said blast tube having vents opening peripherally therethrough, said blast tube sealably engaging said second disk so as to prevent the passage of said muzzle blast between said blast tube and said second disk, said blast tube and disks defining an expansion chamber through which said barrels extend;

an arcuate shaped nose extending forwardly of said muzzle ends and mounted on said barrels for rotation therewith, said nose section sealably engaging said blast tube, said nose section defining a blast collection chamber in communication with said windows and expansion chamber;

exit tubes mounted to said nose and extending therethrough, said exit tubes individual to said barrels for providing passageways for projectiles fired through said barrels;

gas stripper means mounted to said nose intermediate of said exit tubes and said barrels for stripping and diverting the muzzle blast occasioned by the discharge of projectiles from said gun into said blast collection chamber of said nose;

the interaction of said stripper means, blast collection chamber, windows, and blast expansion chamber being such that said muzzle blast occasioned by the discharge of projectiles from said gun are rendered innocuous to an aircraft.

2. The device of claim 1 wherein said gas stripper means comprises annular members individual to said barrels and coaxially aligned therewith, said annular members positioned between said exit tubes and said barrels, said annular members affording clearance for projectiles fired from said gun.

3. The device of claim 1 wherein said gas stripper means comprises tubular members individual to said barrels, said tubular members each having a peripheral opening through which said muzzle blast passes, said tubular members providing a passageways for projectiles fired through said barrels.

4. The device of claim 1 wherein said blast tube is mounted to said disks so as to rotate therewith.

5. The device of claim 1 further comprising:

a peripheral housing positioned around and spaced from said device, said housing having a forward open end through which said device protrudes and peripheral perforations opposite of the aircraft;

sealing means located rearwardly of said perforations and extending radially from said blast tube to said pod for preventing passage of said muzzle blast rearwardly of said sealing means, so that said muzzle blast expands in said housing and exhausts through said perforations at a pressure and in a direction innocuous to said aircraft.

* * * * *